United States Patent Office 2,885,462
Patented May 5, 1959

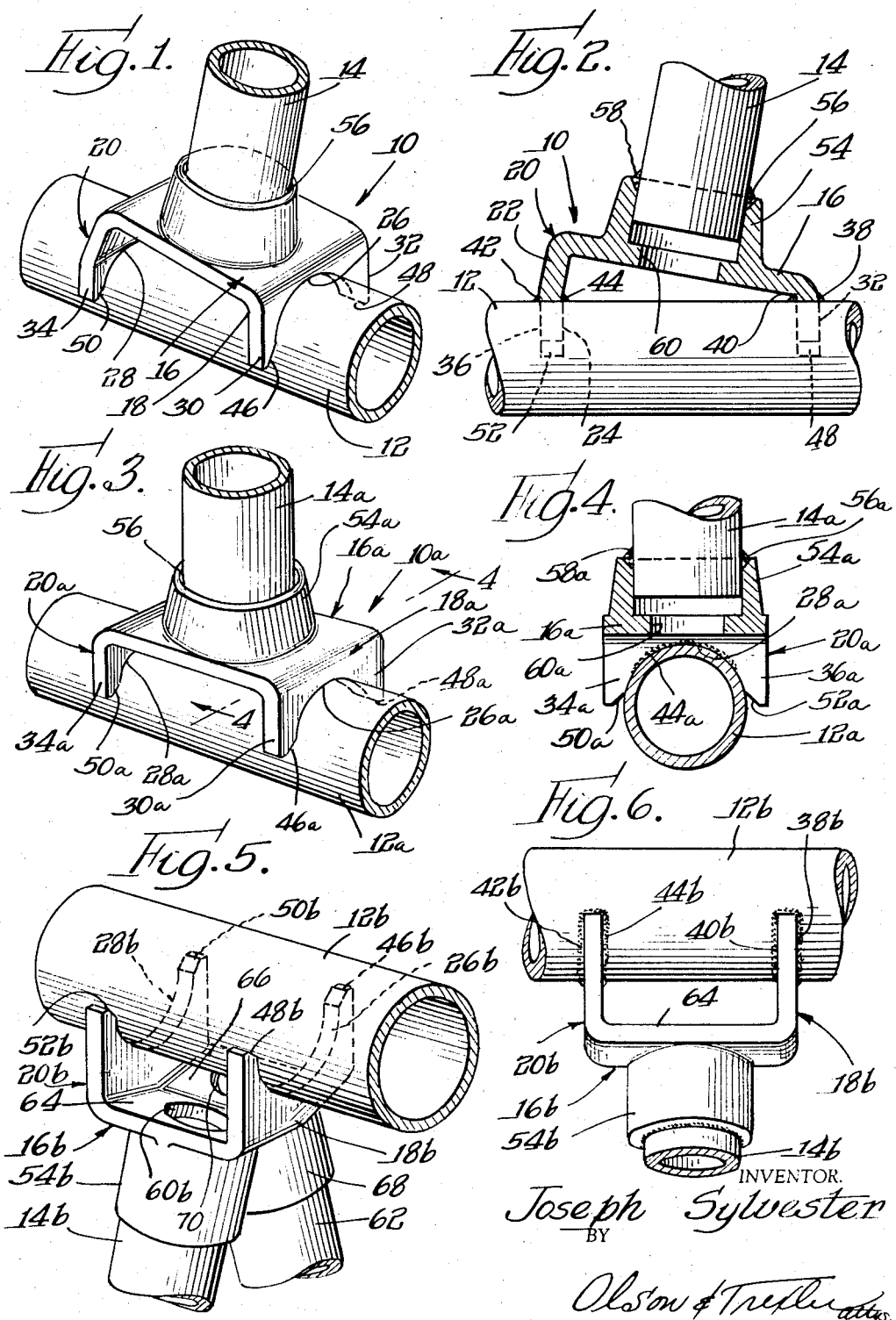

2,885,462
WELD FITTING

Joseph Sylvester, Erie, Pa., assignor to Penn-Union Electric Corporation, Erie, Pa., a corporation of Pennsylvania Application December 14, 1956, Serial No. 628,388

7 Claims. (Cl. 174—94)

The present invention relates to novel fittings for joining angularly disposed electrical buses, and more particularly to novel fittings for facilitating welded connection between angularly disposed tubular aluminum buses of the type frequently used in electrical power substations.

Heretofore, bolt type fittings have been suggested for joining buses in structures of the type contemplated herein, but welded joints have in many cases been found to be more economical and therefore preferable. Such welded joints have heretofore been provided by cutting the ends of one or more tubular buses so that they may be joined directly to another tubular bus or by cutting the ends on a bias so that they may be welded to a flat surface of a member secured to another bus. Such a procedure requires the expenditure of considerable time and labor and also usually requires the lengths of the buses be held to close tolerances.

It is an important object of the present invention to provide a novel and rugged aluminum fitting which may be easily and securely welded to one tubular bus and to which fitting another aluminum bus may be readily welded without requiring the second bus to be cut or otherwise especially prepared.

Another object of the present invention is to provide a novel fitting of the above described type which is adapted to be welded to a plurality of angularly disposed buses and which is constructed so as to allow for minor errors in the lengths of the buses, which error frequently arises during the building of a power substation.

Other objects and advantages of the present invention will become apparent from the following description and the accompanying drawings wherein:

Fig. 1 is a fragmentary perspective view showing a fitting incorporating the features of the present invention assembled with but not welded to a pair of angularly disposed tubular buses, which fitting is adapted to accommodate buses which are disposed at an angle of less than 90° with respect to each other;

Fig. 2 is a partial cross sectional view showing the assembly of Fig. 1 with the fitting welded to the buses;

Fig. 3 is a fragmentary perspective view similar to Fig. 1 but showing a modified fitting which is adapted to accommodate a pair of buses disposed at right angles to each other;

Fig. 4 is a partial vertical sectional view taken along line 4—4 in Fig. 3 and further showing the elements welded to each other;

Fig. 5 is a fragmentary perspective view showing a fitting incorporating another modified form of the present invention, which fitting is adapted for connecting a pair of diverging tap buses to a main bus for providing an A frame construction; and Fig. 6 is a side elevational view of the assembly shown in Fig. 5 and further showing the elements welded to each other.

Referring now more specifically to the drawings wherein like parts are designated by the same numerals throughout the various figures, a fitting 10 incorporating one embodiment of the present invention is shown in Figs. 1 and 2, which fitting is cast of non-heat treatable high strength aluminum alloy material such as ASTM ZG 32A which is commercially known as Apex Smelting Ternalloy 5. Such an alloy has the characteristic that it does not lose its physical properties and strength when heated to a welding temperature so that the fitting is adapted to provide a rugged connection between a plurality of buses. In this embodiment, the fitting 10 is adapted to provide a connection between a tubular aluminum bus 12 and a second tubular aluminum bus 14 which is inclined at an acute angle with respect to the bus 12.

The one-piece fitting 10 comprises a substantially flat body portion 16 and opposite end flanges 18 and 20 disposed transversely of the axis of the bus 12 to which the fitting is to be applied. As shown in the drawings, the fitting is constructed so that when it is applied to the bus 12 the body portion 16 is disposed at an acute angle to the longitudinal axis of the bus and the flange 18 is disposed at a complementary obtuse angle to the body portion 16 so that it is substantially perpendicular to the axis of the bus 12. The flange 20 has a first portion 22 substantially perpendicular to the body section 16 and a second portion 24 parallel to the flange 18. The flange 18 and the flange portion 24 are respectively provided with curved or semi-circular seats 26 and 28 which are adapted to conform to the curvature bus 12. The curved seats in effect provide the flange sections 18 and 24 with finger portions 30—32 and 34—36 respectively which are adapted to project along opposite sides of the bus 12. The fitting is easily and securely welded to the bus 12 by providing weld beads 38 and 40 between the bus and inner and outer margins of the seat 26 and similar weld beads 42 and 44 between the bus and inner and outer margins of the seat 28. In addition, it is to be noted that the ends of the flange fingers are respectively beveled as indicated at 46, 48, 50 and 52, and extensions of the above mentioned weld beads may be readily provided between these beveled surfaces and the bus 12 for even more securely joining the fitting to the bus.

An anular socket 54 of substantial axial extent is formed integrally with the body portion 16 and disposed so that its axis is perpendicular to the plane of the body portion. The socket 54 is adapted to receive an end of the bus 14 and it will be appreciated that this end of the bus need not be cut or otherwise especially prepared for assembly with the socket. Furthermore, it is to be noted that the bus 14 may be inserted into the socket 54 various amounts so that the bus 14 may be adjusted prior to welding thereof to the socket to compensate for minor errors and its length. The socket 54 is provided with a beveled or enlarged mouth 56 which facilitates the provision of a secure annular weld bead 58 between the bus 14 and the socket.

An aperture 60 is formed in the body section preferably substantially concentric with the annular socket 54 and has a diameter less than the internal diameter of the socket. Thus, the portion of the body section which extends within the diameter of the socket provides an abutment for limiting insertion of the bus 14 into the socket. It is to be noted, that with the above described structure only limited areas of the fitting contact the tubular buses so that air cooling of the joint structure is facilitated. More specifically, the arrangement is such that the body section 16 and thus the major portions of the fitting are spaced from the bus 12 to permit air flow therebetween, and the aperture 60 in the body section provides for air flow into the socket and into the bus 14 for cooling purposes.

Figs. 3 and 4 show a modified form of the present invention which is similar to the above described structure as indicated by the application of identical reference numerals with the suffix *a* added to corresponding elements. This embodiment differs in that the above mentioned portion 22 of the flange 20 has been eliminated and the opposite end flanges of the fitting are disposed perpendicular to the body section. Thus, when the fitting is assembled with the buses, the body section 16a is spaced from the bus 12a and disposed parallel to the longitudinal axis of the bus 12a and the bus 14a is supported at right angles to the bus 12a.

In Figs. 5 and 6 there is shown another embodiment of the present invention which is especially useful for the construction of A frames in a power substation. This embodiment is similar to the structure described above as indicated by the application of identical reference numerals with the suffix *b* added to corresponding elements and differs in that it is adapted for connecting a pair of angularly disposed buses 14b and 62 to the bus 12b. More specifically, the body section 16b is provided with a pair of angularly disposed portions 64 and 66. The socket 54b is formed integral with the body portion 64 and a second socket portion 68 is formed integral with the body portion 66. The socket 68 is essentially identical to the socket portion 54b, and an aperture 70 similar to the aperture 60b is provided in the body portion 66 and opens within the socket 68.

While the preferred embodiments of the present invention have been shown and described herein, it is obvious that many structural details may be changed without departing from the spirit and scope of the appended claims.

The invention is claimed as follows:

1. A welding fitting for joining a plurality of tubular aluminum electrical buses comprising a substantially flat non-heat treatable high strength aluminum alloy body portion, a pair of flanges respectively integral with opposite ends of said body portion and extending laterally therefrom, means defining substantially axially aligned substantially semicircular seats in said flanges for conforming to a peripheral surface of one bus to which the flanges are to be welded, and an annular socket portion integral with said body portion and extending generally oppositely from said flanges for adjustably receiving an end of a second bus which is to be welded to the socket portion.

2. A welding fitting, as defined in claim 1, wherein each of said flanges includes finger portions separated and partially defined by its seat, each of said finger portions including an outwardly beveled end surface merging with an adjacent end of an adjacent seat for facilitating welding of the flanges to a bus, and said socket portion having a beveled mouth for facilitating welding of a second bus thereto.

3. A welding fitting for joining a plurality of tubular aluminum buses comprising a substantially flat aluminum alloy body portion, a pair of flanges respectively integral with opposite ends of said body portion and extending laterally therefrom, means defining substantially axially aligned arcuate seats on said flanges for conforming to a peripheral surface of one bus to which the flanges are to be welded, each of said flanges having outwardly beveled surfaces merging with opposite ends of its arcuate seat for facilitating welding of the flanges to said one bus, at least one of said arcuate seats being entirely laterally spaced from said body for spacing said body from said one bus to permit air circulation therebetween, an annular socket portion integral with said body and extending generally oppositely from said flanges for adjustably receiving an end of a second bus to be welded thereto, and means defining an aperture through said body aligned with said socket portion for permitting air circulation within said socket portion, said aperture having a diameter less than an internal diameter of said socket portion so that an internal margin of the body around said aperture provides a stop for preventing said second bus from passing entirely through said socket portion.

4. A welding fitting, as defined in claim 3, wherein said one arcuate seat is spaced a greater distance from said body than the other of said arcuate seats for locating said body at an angle with respect to said one bus when the fitting is applied to said one bus, said socket portion having its axis substantially perpendicular to said body for supporting said second bus at an angle with respect to the first mentioned bus.

5. A welding fitting, as defined in claim 3, wherein both of said arcuate seats are entirely spaced laterally from said body substantially the same amount for locating said body substantially parallel to said one bus, said socket portion having its axis substantially perpendicular to said body for supporting said second bus substantially perpendicularly with respect to said first mentioned bus.

6. A welding fitting, as defined in claim 3, which includes a second angular socket portion integral with said body for receiving an end of a third bus, said body including means defining a second aperture therethrough aligned with said second socket portion.

7. A welding fitting for joining a plurality of tubular aluminum electrical buses comprising a substantially flat aluminum alloy body portion, a pair of flanges respectively integral with opposite ends of said body portion and extending laterally therefrom, means defining substantially axially aligned seats in said flanges for accommodating a peripheral surface of one bus to which the flanges are to be welded, said body portion including a section spaced laterally from said seats so that there will be an air space between said section and said one bus when said flanges are welded to said one bus, a socket portion integral with said section of the body portion and extending generally oppositely from said flanges and having a bore therein for receiving an end of a second bus which is to be welded to the socket portion, and means defining an aperture through said section of the body portion and communicating with said bore for permitting air circulation into the socket portion.

References Cited in the file of this patent
UNITED STATES PATENTS

| | | |
|---|---|---|
| 843,163 | McCarthy | Feb. 5, 1907 |
| 2,219,599 | Penote | Oct. 29, 1940 |